US008558877B2

(12) United States Patent
Irie et al.

(10) Patent No.: US 8,558,877 B2
(45) Date of Patent: Oct. 15, 2013

(54) VIDEO PROCESSING DEVICE, VIDEO PROCESSING METHOD AND RECORDING MEDIUM

(75) Inventors: Yutaka Irie, Yokohama (JP); Toshihiro Morohoshi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/547,994

(22) Filed: Jul. 12, 2012

(65) Prior Publication Data

US 2013/0147929 A1    Jun. 13, 2013

(30) Foreign Application Priority Data

Dec. 9, 2011  (JP) .................................. 2011-270040

(51) Int. Cl.
*H04N 13/04* (2006.01)
(52) U.S. Cl.
USPC ............................................ 348/54; 345/419
(58) Field of Classification Search
None
See application file for complete search history.

(56) References Cited

U.S. PATENT DOCUMENTS 7,215,302 B2    5/2007  Satoh et al.

FOREIGN PATENT DOCUMENTS

| JP | 2000-315076 | 11/2000 |
|---|---|---|
| JP | 2002-365593 | 12/2002 |
| JP | 2009-250987 | 10/2009 |
| JP | 4758520 | 6/2011 |
| WO | WO 2011/108702 | 9/2011 |

*Primary Examiner* — Christopher S Kelley
*Assistant Examiner* — Mohammed Jebari
(74) *Attorney, Agent, or Firm* — Knobbe, Martens, Olson & Bear LLP

(57) ABSTRACT

According to one embodiment, a video processing device includes a test pattern controller configured to output a test pattern to a display capable of displaying stereoscopically. The test pattern is indicative of whether a viewer is substantially at a center of a viewing area in which a video is viewed stereoscopically. The test pattern includes first to sixth parallax images corresponding to respective first to sixth viewing points arranged in a horizontal direction. The third parallax image and the fourth parallax image include a first mark The first parallax image and the sixth parallax image include a second mark different from the first mark. The second parallax image and the fifth parallax image include neither the first mark nor second mark.

20 Claims, 12 Drawing Sheets

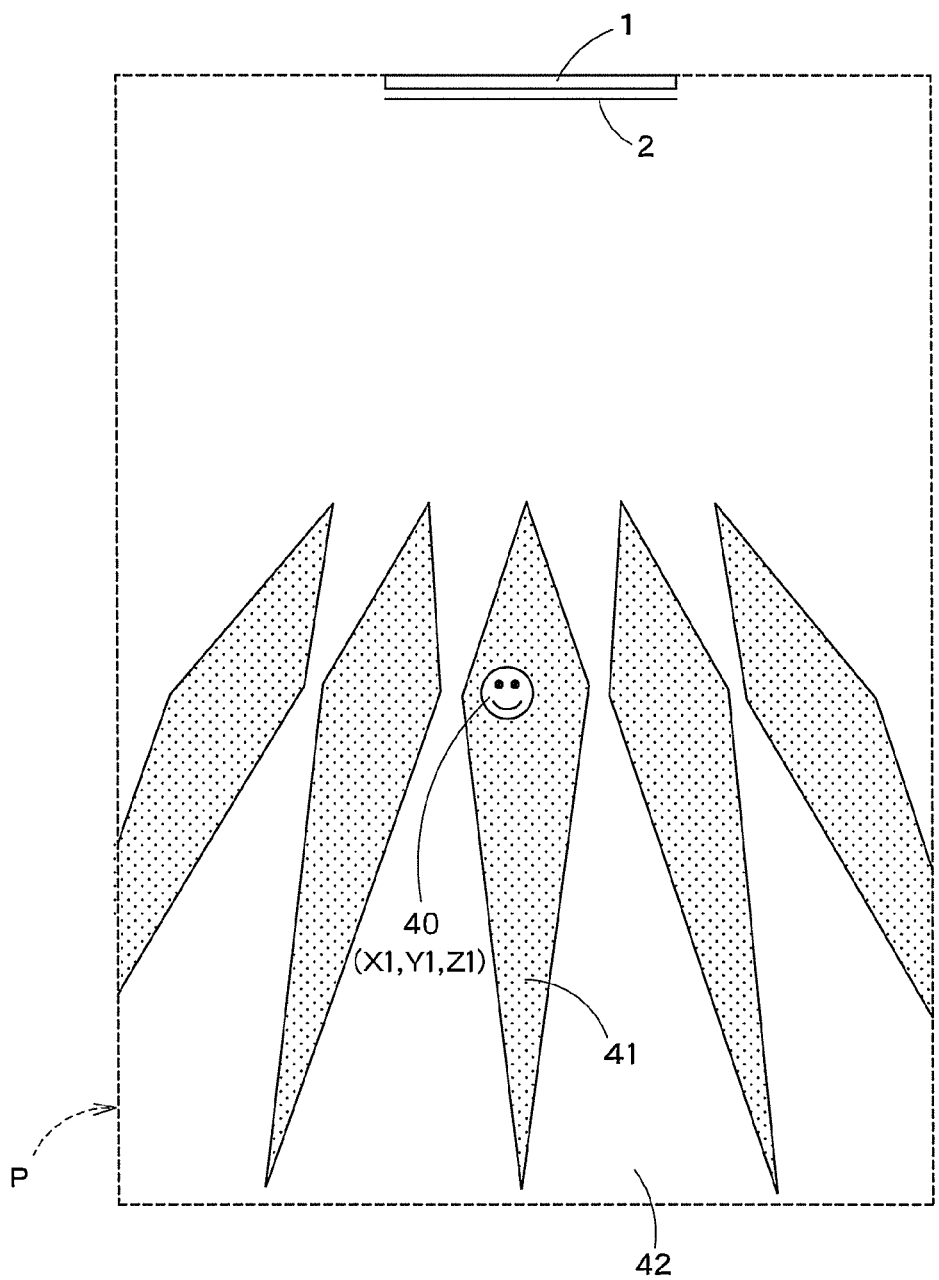
F I G. 4

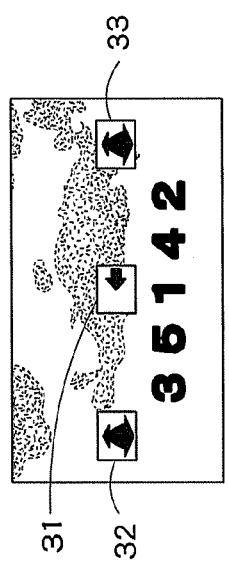
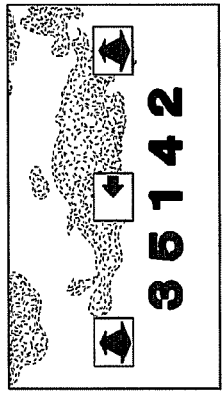
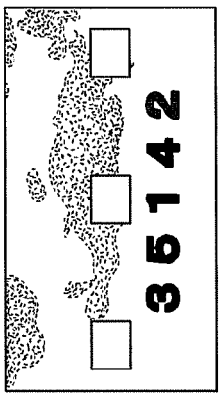
FIG. 5A  FIG. 5B  FIG. 5C
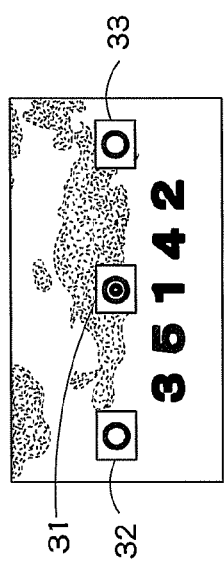
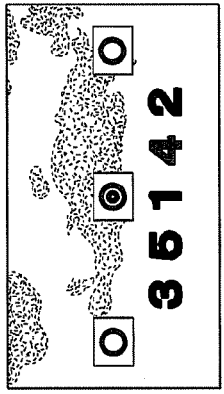
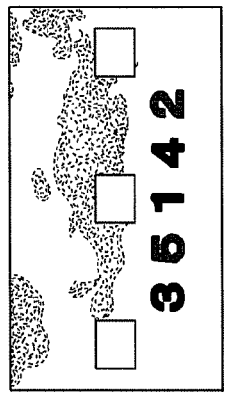
FIG. 5D  FIG. 5E  FIG. 5F
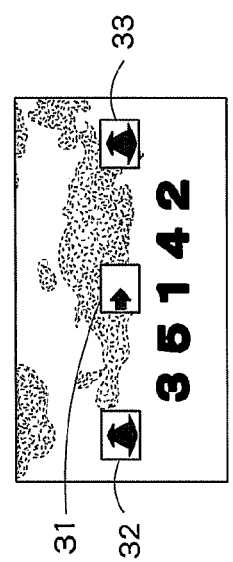
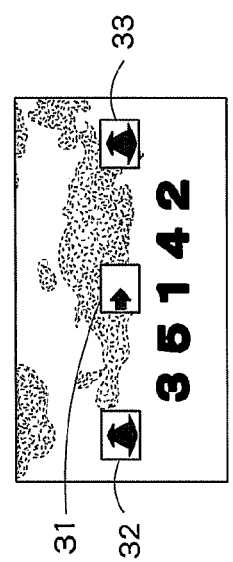
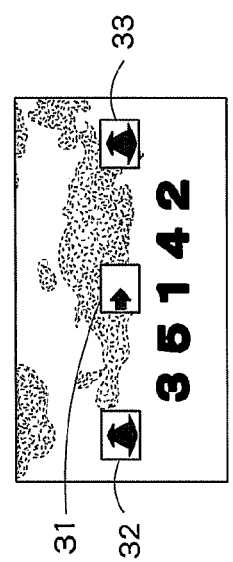
FIG. 5G  FIG. 5H  FIG. 5I

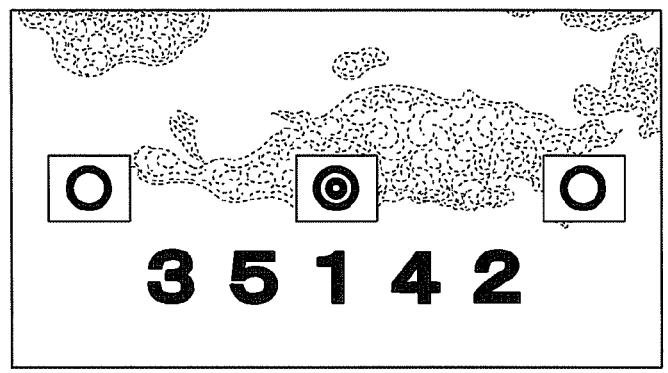
F I G. 6
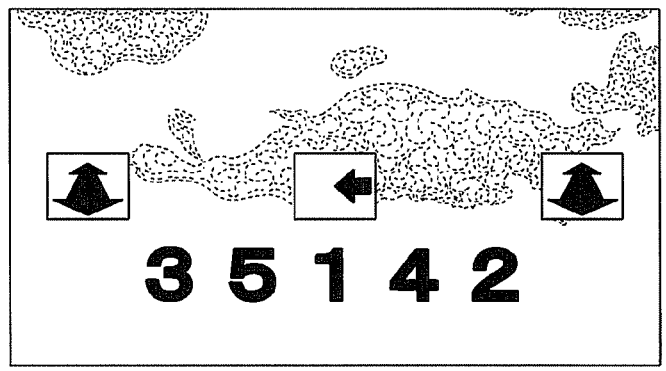
F I G. 7
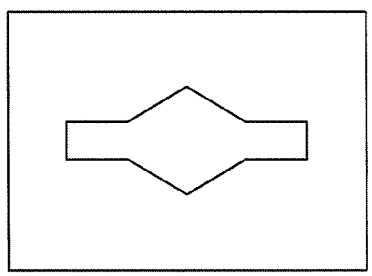 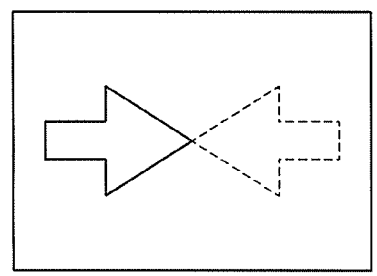
F I G. 8A              F I G. 8B

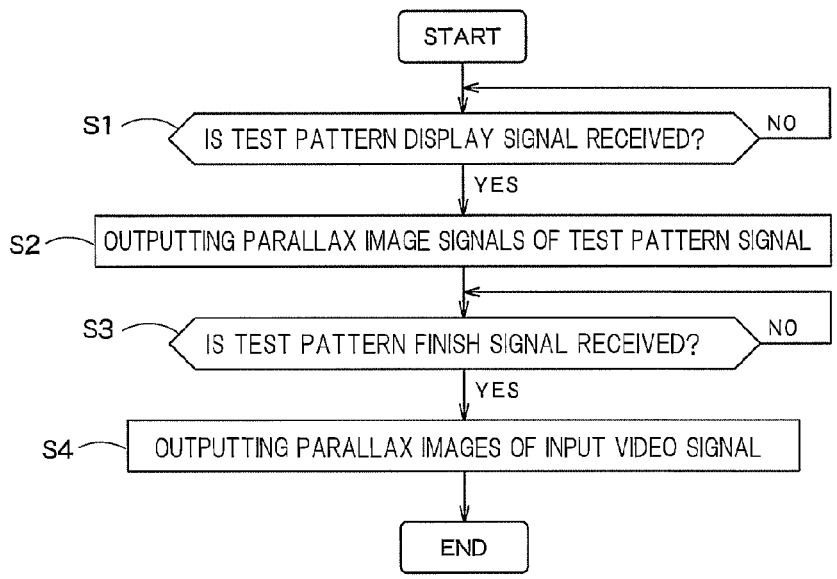
F I G. 10
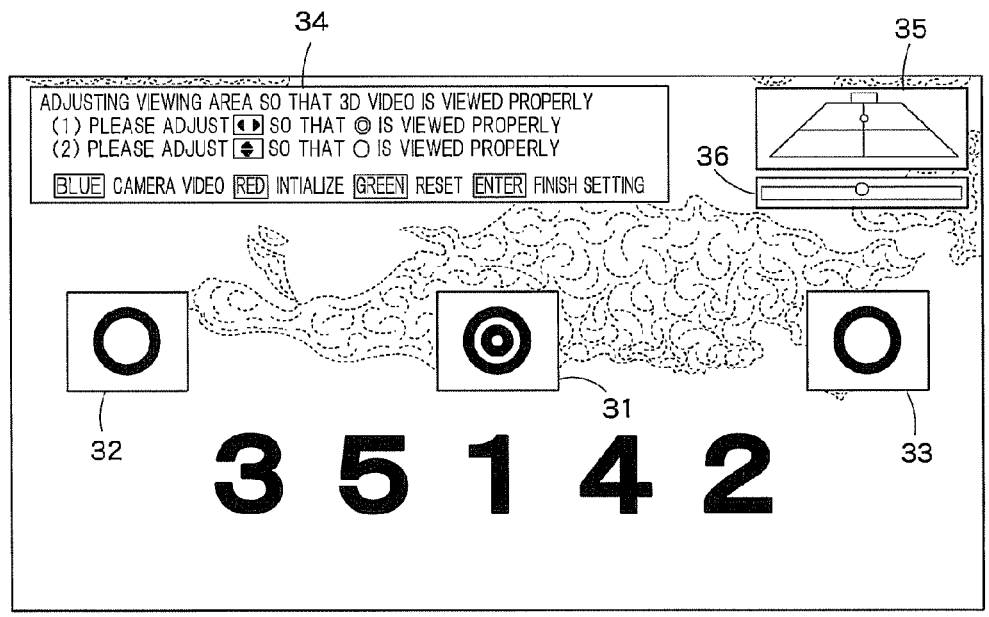
F I G. 11

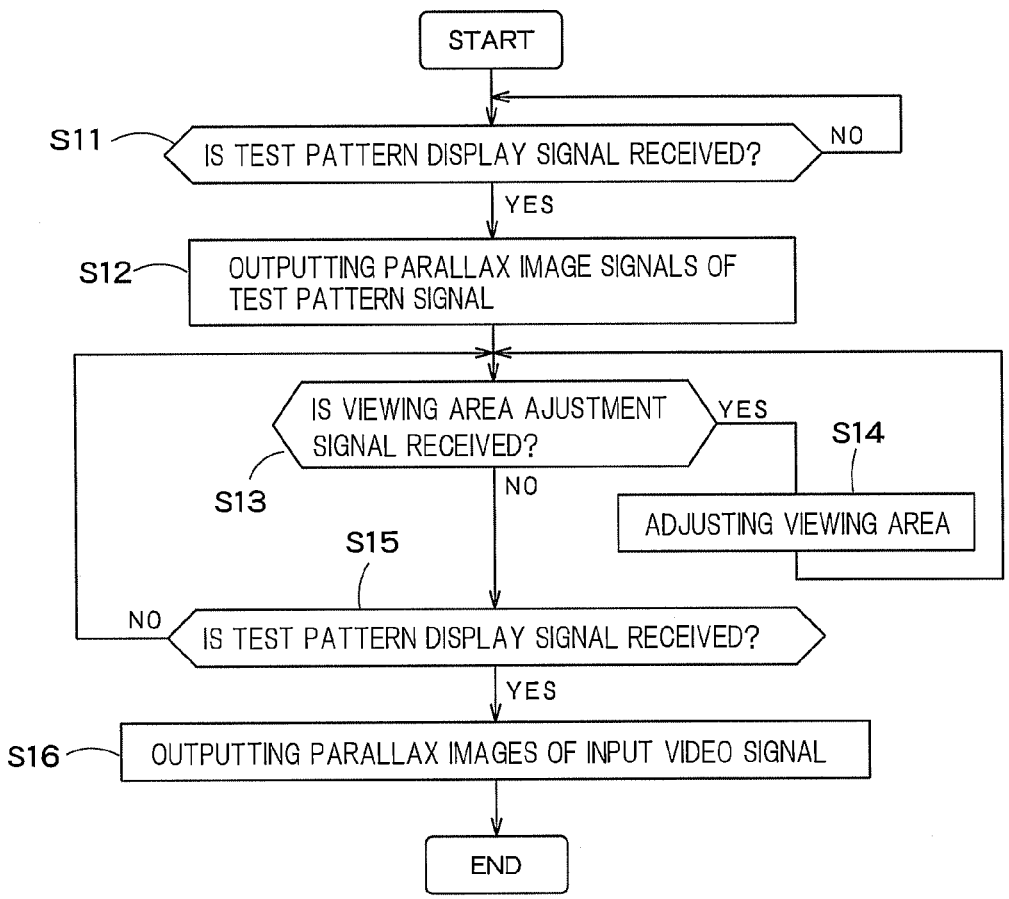
F I G. 12

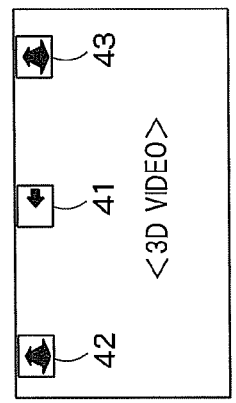
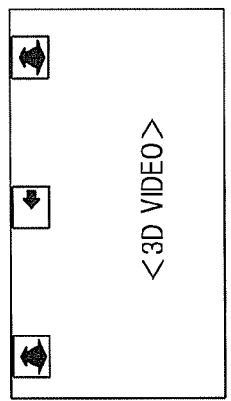
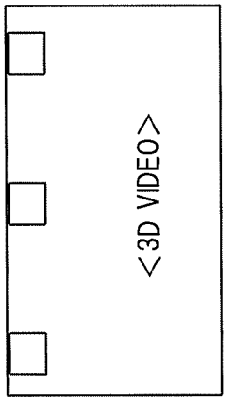
FIG. 13A  FIG. 13B  FIG. 13C
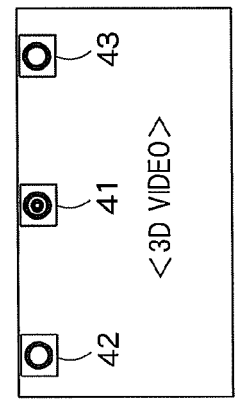
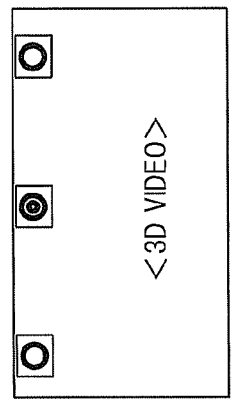
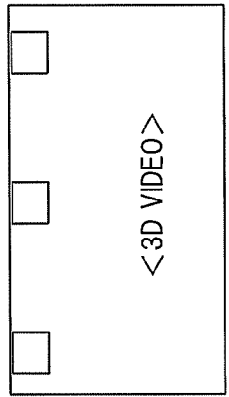
FIG. 13D  FIG. 13E  FIG. 13F
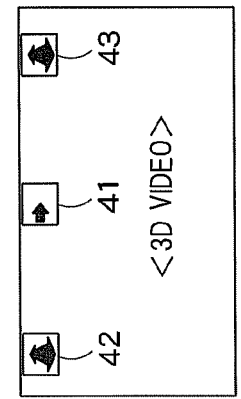
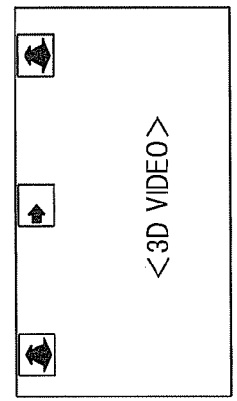
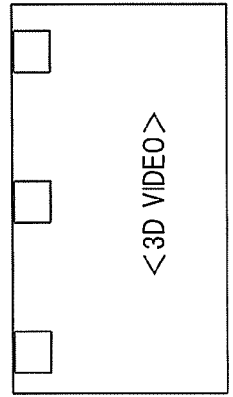
FIG. 13G  FIG. 13H  FIG. 13I

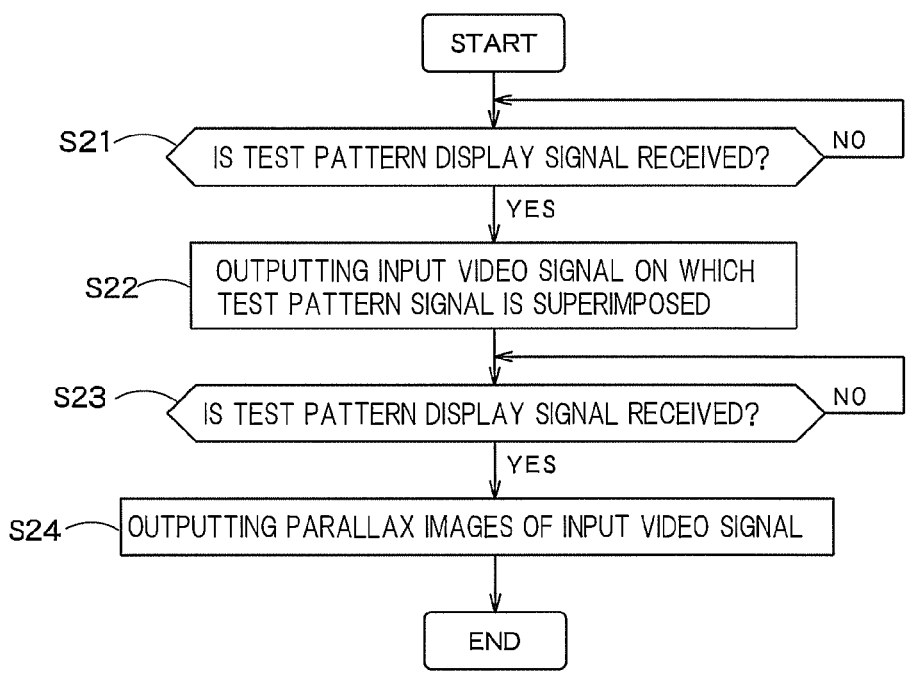
F I G. 14

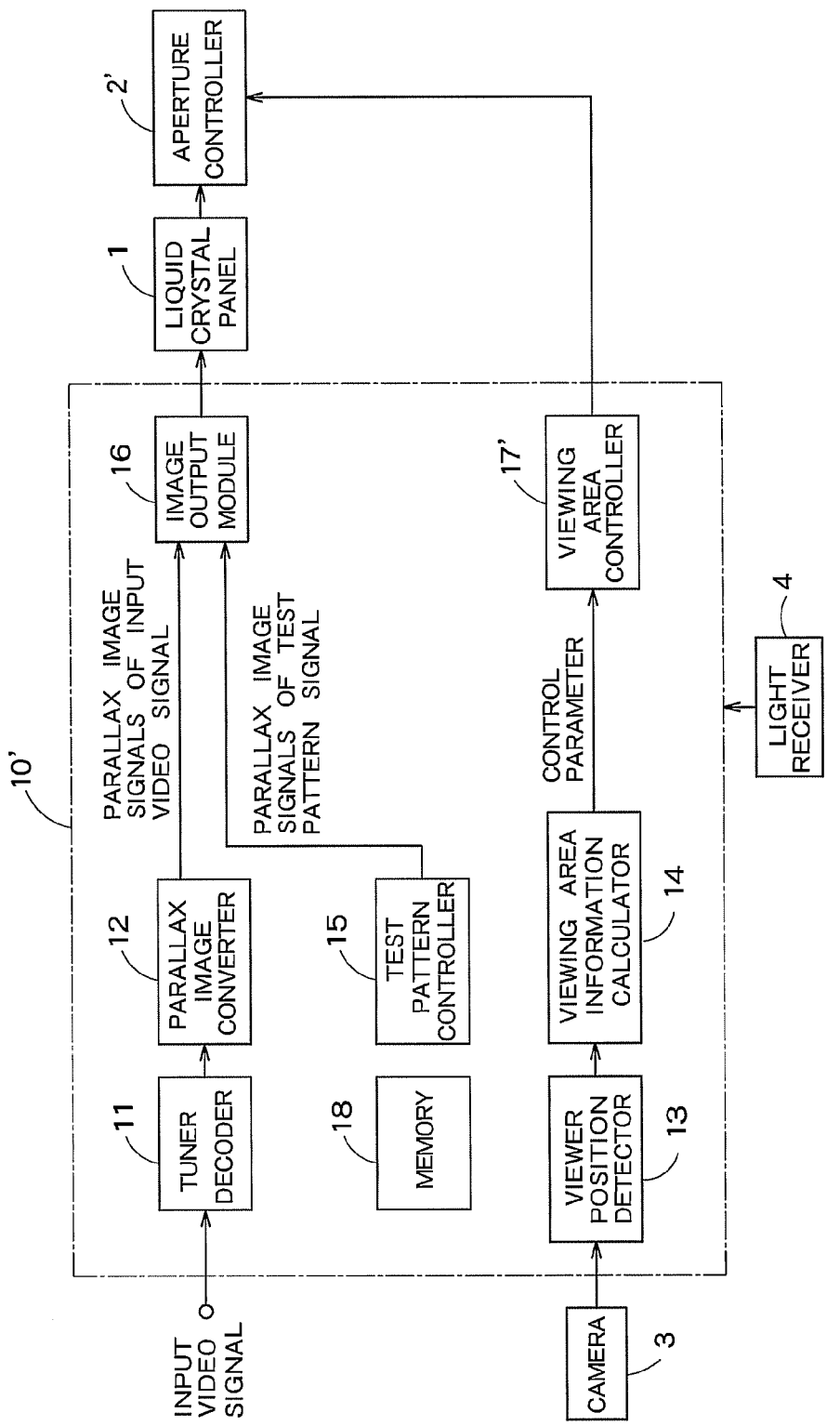
F I G. 15

VIDEO PROCESSING DEVICE, VIDEO PROCESSING METHOD AND RECORDING MEDIUM

CROSS REFERENCE TO RELATED APPLICATIONS

This application is based upon and claims the benefit of priority from the prior Japanese Patent Application No. 2011-270040, filed on Dec. 9, 2011; the entire contents of which are incorporated herein by reference.

FIELD

Embodiments described herein relate generally to a video processing device, a video processing method and a recording medium.

BACKGROUND

In recent years, stereoscopic video display devices (so-called autostereoscopic TVs), through which a viewer can view video auto-stereoscopically without using special glasses, are becoming widely used. This kind of stereoscopic video display device displays a plurality of images whose viewpoints are different from each other. Output directions of light beams from the images are controlled by, for example, a parallax barrier, a lenticular lens, or the like, so that the light beams are guided to the eyes of the viewer. If the position of the viewer is appropriate, the viewer views different parallax images with the left eye and the right eye, and thus, the viewer can recognize video stereoscopically.

However, there is a problem that video displayed on the autostereoscopic TV is not viewed stereoscopically depending on the position of the viewer. When the viewer views normal video, it may be difficult to determine whether or not the viewer is located at an appropriate position from which the viewer can view the video stereoscopically.

BRIEF DESCRIPTION OF THE DRAWINGS

FIG. 4 is a diagram schematically showing a viewing area.
FIGS. 5A to 5I are diagrams showing an example of the test pattern of the first embodiment.
FIG. 6 is a diagram schematically showing an image recognized by the viewer when the viewer views the parallax image 24 with the right eye and views the parallax image 25 with the left eye.
FIG. 7 is a diagram schematically showing an image recognized by the viewer when the viewer views two parallax images among the parallax images 21 to 23 and 29 with the right eye and the left eye.
FIGS. 8A and 8B are diagrams schematically showing how the test pattern is seen.
FIG. 10 is a flowchart showing an example of a processing operation of the controller 10 according to the remote control operation.
FIG. 11 is a diagram showing an example of the test pattern of the second embodiment.
FIG. 12 is a flowchart showing an example of a processing operation of the controller 10 when the controller 10 adjusts the viewing area by using the test pattern shown in FIG. 11.
FIGS. 13A to 13I are diagrams showing an example of the test pattern of the third embodiment.
FIG. 14 is a flowchart showing an example of a processing operation of the controller 10.
FIG. 15 is a block diagram showing a schematic configuration of the video display device 100' which is a modified example of the embodiments shown in FIG. 2.

DETAILED DESCRIPTION

In general, according to one embodiment, a video processing device includes a test pattern controller configured to output a test pattern to a display capable of displaying stereoscopically. The test pattern is indicative of whether a viewer is substantially at a center of a viewing area in which a video is viewed stereoscopically. The test pattern includes first to sixth parallax images corresponding to respective first to sixth viewing points arranged in a horizontal direction. The third parallax image and the fourth parallax image include a first mark The first parallax image and the sixth parallax image include a second mark different from the first mark. The second parallax image and the fifth parallax image include neither the first mark nor second mark.

Hereinafter, embodiments will be described with reference to the drawings.

(First Embodiment)

Figure 1:
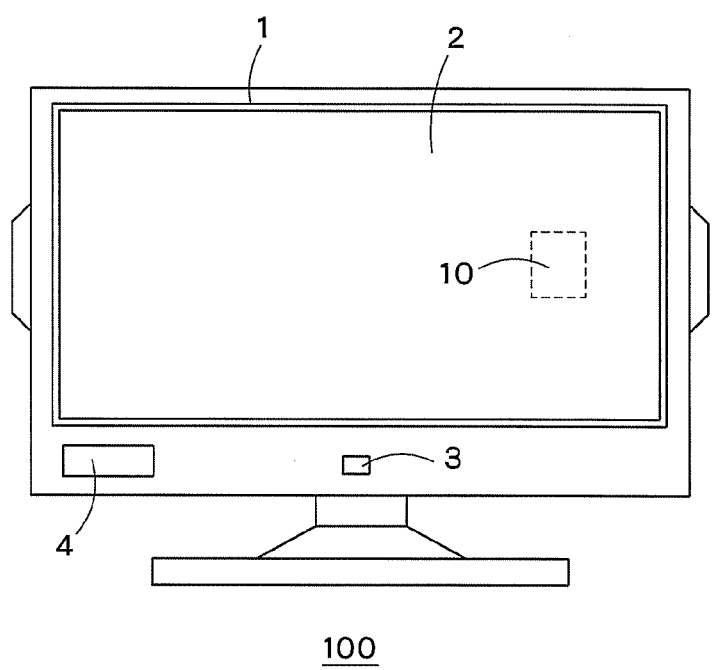
FIG. 1 is an external view of a video display device 100 according to an embodiment.
Figure 2:
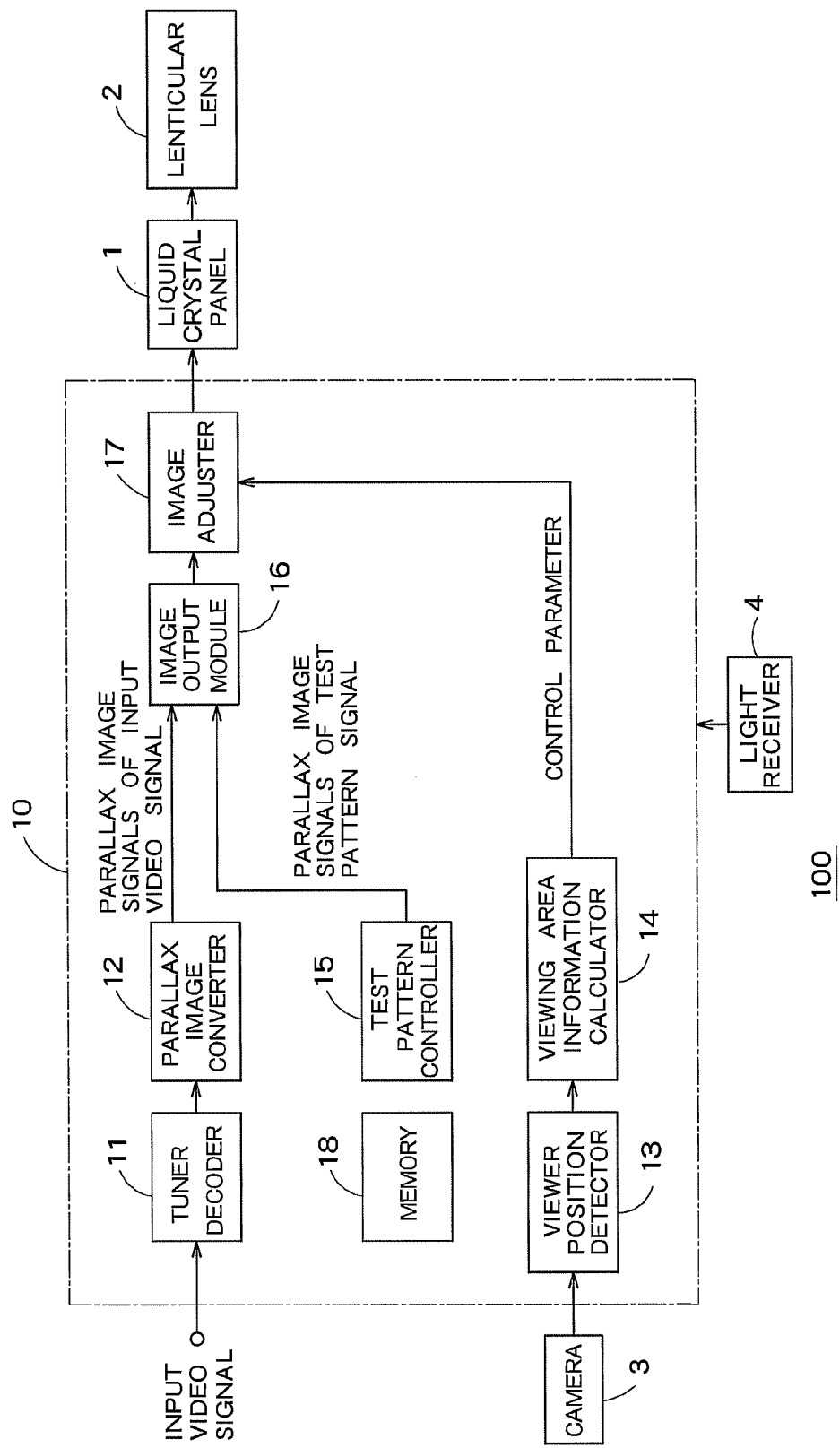
FIG. 2 is a block diagram showing a schematic configuration of the video display device 100.

FIG. 1 is an external view of a video display device 100 according to an embodiment. FIG. 2 is a block diagram showing a schematic configuration of the video display device 100. The video display device 100 includes a liquid crystal panel 1, a lenticular lens 2, a camera 3, a light receiver 4, and a controller 10.

The liquid crystal panel (display unit) 1 displays a plurality of parallax images which can be observed as stereoscopic video by a viewer located in a viewing area. The liquid crystal panel 1 is, for example, a 55-inch size panel and has 4K2K (3840*2160) pixels. A lenticular lens is obliquely arranged on the liquid crystal panel 1, so that it is possible to produce an effect corresponding to a liquid crystal panel in which 11520 (=1280*9) pixels in the horizontal direction and 720 pixels in the vertical direction are arranged to stereoscopically display an image. Hereinafter, a model in which the number of pixels in the horizontal direction is extended in this way will be described. In each pixel, three sub-pixels, that is, an R sub-pixel, a G sub-pixel, and a B sub-pixel, are formed in the vertical direction. The liquid crystal panel 1 is irradiated with light from a backlight device (not shown in FIG. 1) provided on a rear surface. Each pixel transmits light with intensity according to a parallax image signal (described later) supplied from the controller 10.

The lenticular lens (aperture controller) 2 outputs a plurality of parallax images displayed on the liquid crystal panel 1 (display unit) in a predetermined direction. The lenticular lens 2 has a plurality of convex portions arranged along the horizontal direction of the liquid crystal panel 1. The number of the convex portions is ⅑ of the number of pixels in the horizontal direction of the liquid crystal panel 1. The lenticular lens 2 is attached to a surface of the liquid crystal panel 1 so that one convex portion corresponds to 9 pixels arranged in the horizontal direction. Light passing through each pixel is outputted with directivity from near the apex of the convex portion in a specific direction.

In the description below, an example will be described in which 9 pixels are provided for each convex portion of the lenticular lens 2 and a multi-parallax manner of 9 parallaxes can be employed. In the multi-parallax manner, a first to a ninth parallax images are respectively displayed on the 9 pixels corresponding to each convex portion. The first to the ninth parallax images are images respectively obtained by viewing a subject from nine viewpoints aligned along the horizontal direction of the liquid crystal panel 1. The viewer can view video stereoscopically by viewing one parallax image among the first to the ninth parallax images with the left eye and viewing another parallax image with the right eye through the lenticular lens 2. According to the multi-parallax manner, the greater the number of parallaxes is, the lager the viewing area is. The viewing area is an area where a viewer can view video stereoscopically when the viewer views the liquid crystal panel 1 from the front of the liquid crystal panel 1.

The liquid crystal panel 1 can display a two-dimensional image by displaying the same color by 9 pixels corresponding to each convex portion.

In the present embodiment, the viewing area can be variably controlled according to a relative positional relationship between a convex portion of the lenticular lens 2 and the parallax images to be displayed, that is, how the parallax images are displayed on the 9 pixels corresponding to each convex portion. Hereinafter, the control of the viewing area will be described.

Figure 3A:
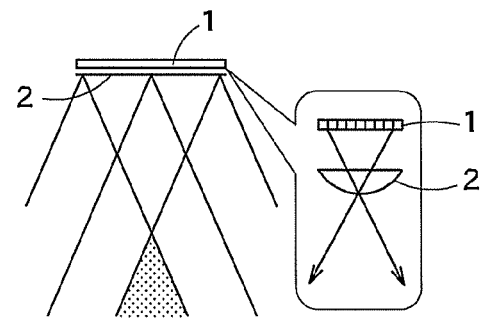
FIGS. 3A to 3C are diagrams of a part of the liquid crystal panel 1 and the lenticular lens 2 as seen from above.

FIG. 3 is a diagram of a part of the liquid crystal panel 1 and the lenticular lens 2 as seen from above. The shaded areas in FIG. 3 indicate the viewing areas. When the liquid crystal panel 1 is viewed from a viewing area, video can be viewed stereoscopically. In other areas, reverse view and/or crosstalk occur and video is difficult to be viewed stereoscopically. The nearer to the center of the viewing area the viewer is located, the more the viewer can feel stereoscopic effect. However, even when the viewer is located in the viewing area, if the viewer is located at an edge of the viewing area, the viewer may not feel sufficient stereoscopic effect or the reverse view may occur.

FIG. 3 shows a relative positional relationship between the liquid crystal panel 1 and the lenticular lens 2, more specifically, a situation in which the viewing area varies depending on a distance between the liquid crystal panel 1 and the lenticular lens 2, or depending on the amount of shift between the liquid crystal panel 1 and the lenticular lens 2 in the horizontal direction.

In practice, the lenticular lens 2 is attached to the liquid crystal panel 1 by accurately positioning the lenticular lens 2 to the liquid crystal panel 1, and thus, it is difficult to physically change the relative positions of the liquid crystal panel 1 and the lenticular lens 2.

Therefore, in the present embodiment, display positions of the first to the ninth parallax images displayed on the pixels of the liquid crystal panel 1 are shifted, so that the relative positional relationship between the liquid crystal panel 1 and the lenticular lens 2 is changed apparently. Thereby, the viewing area is adjusted.

Figure 3B:
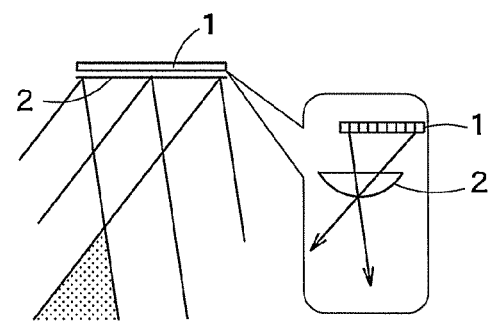
Figure 3C:
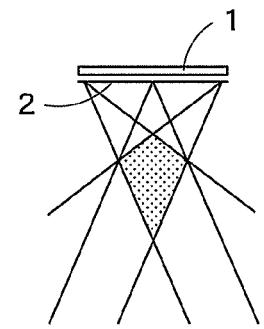

For example, comparing to a case in which the first to the ninth parallax images are respectively displayed on the 9 pixels corresponding to each convex portion (FIG. 3A), the viewing area moves left when the parallax images are collectively shifted right (FIG. 3B). On the other hand, when the parallax images are collectively shifted left, the viewing area moves right.

When the parallax images are not shifted near the center in the horizontal direction, and the nearer to the outer edge of the liquid crystal panel 1 the parallax images are located, the larger the parallax images are shifted outward (FIG. 3C), the viewing area moves toward the liquid crystal panel 1. A pixel between a parallax image that is shifted and a parallax image that is not shifted, and/or a pixel between parallax images that are shifted by different amounts, may be generated by interpolation according to surrounding pixels. Contrary to FIG. 3C, when the parallax images are not shifted near the center in the horizontal direction, and the nearer to the outer edge of the liquid crystal panel 1 the parallax images are located, the larger the parallax images are shifted toward the center, the viewing area moves outward from the liquid crystal panel 1.

In this way, by shifting and displaying all the parallax images or a part of the parallax images, the viewing area can be moved in the left-right direction or the front-back direction with respect to the liquid crystal panel 1. Although only one viewing area is shown in FIG. 3 for the simplicity of the description, actually, there are a plurality of viewing areas in an audience area P and the viewing areas move in conjunction with each other as shown in FIG. 4. The viewing areas are controlled by the controller 10 shown in FIG. 2 described later.

Referring back to FIG. 1, the camera 3 is attached near the lower center position of the liquid crystal panel 1 at a predetermined elevation angle. The camera 3 takes video in a predetermined range in front of the liquid crystal panel 1. The taken video is supplied to the controller 10 and used to detect information related to the viewer such as the position of the viewer and the face of the viewer. The camera 3 may take both a moving image and a still image.

The light receiver 4 is provided at, for example, the lower left portion of the liquid crystal panel 1. The light receiver 4 receives an infrared signal transmitted from a remote control used by the viewer. The infrared signal includes a signal indicating whether to display stereoscopic video or to display two-dimensional video, whether to employ a multi-parallax manner or a two-parallax manner when displaying stereoscopic video, whether to control the viewing areas or not, and the like.

Next, the details of constituent elements of the controller 10 will be described. As shown in FIG. 2, the controller 10 includes a tuner decoder 11, a parallax image converter 12, a viewer position detector 13, a viewing area information calculator 14, a test pattern controller 15, an image output module 16, an image adjuster 17, and a memory 18. The controller 10 is mounted as, for example, one IC (Integrated Circuit) and disposed on the rear surface of the liquid crystal panel 1. Of course, a part of the controller 10 may be implemented as software.

The tuner decoder (receiver) 11 receives and selects an inputted broadcast wave and decodes a coded input video signal. When a data broadcast signal such as electronic program guide (EPG) is superimposed on the broadcast wave, the tuner decoder 11 extracts the data broadcast signal. Or, the tuner decoder 11 receives a coded input video signal from a video output device such as an optical disk reproducing device and a personal computer instead of the broadcast wave and decodes the coded input video signal. The decoded signal is also called a baseband video signal and supplied to the parallax image converter 12. When the video display device 100 receives no broadcast wave and exclusively displays the input video signal received from the video output device, a decoder having only a decoding function may be provided instead of the tuner decoder 11 as a receiver.

The input video signal received by the tuner decoder 11 may be a two-dimensional video signal or a three-dimensional video signal including images for the left eye and the right by a frame-packing (FP) manner, a side-by-side (SBS) manner, a top-and-bottom (TAB) manner, or the like. The video signal may be a three-dimensional video signal including an image of three or more parallaxes.

The parallax image converter 12 converts the baseband video signal into a plurality of parallax image signals in order to display video stereoscopically. The process of the parallax image converter 12 depends on whether the baseband signal is a two-dimensional video signal or a three-dimensional video signal.

When a two-dimensional video signal or a three-dimensional video signal including an image of eight or less parallaxes is inputted, the parallax image converter 12 generates the first to the ninth parallax image signals on the basis of depth information of each pixel in the video signal. A depth value is a value indicating how much near-side or far-side of the liquid crystal panel 1 each pixel is seen. The depth value may be added to the input video signal in advance or the depth value may be generated by performing motion detection, composition recognition, human face detection, and the like on the basis of characteristics of the input video signal. On the other hand, when a three-dimensional video signal including an image of 9 parallaxes is inputted, the parallax image converter 12 generates the first to the ninth parallax image signals by using the video signal.

The parallax image signals of the input video signal generated in this way is supplied to the image output module 16.

The viewer position detector 13 performs face recognition by using video taken by the camera 3 and obtains position information of the face. The position information is supplied to the viewing area information calculator 14.

The position information of the viewer is represented as a position on, for example, an X axis (horizontal direction), a Y axis (vertical direction), and a Z axis (direction perpendicular to the liquid crystal panel 1) using the center of the liquid crystal panel 1 as the origin. More specifically, first, the viewer position detector 13 recognizes the viewer by detecting a face from video taken by the camera 3. Next, the viewer position detector 13 detects a position on the X axis and the Y axis from the position of the face in the video and detects a position on the Z axis from the size of the face. When there are a plurality of viewers, the viewer position detector 13 may detect positions of a predetermined number of viewers, for example, ten viewers. In this case, if the number of detected faces is greater than ten, the viewer position detector 13 detects positions of ten viewers in order from a viewer nearest to the liquid crystal panel 1, that is, in ascending order of position on the Z axis.

The manner by which the viewer position detector 13 detects the position of the viewer is not limited. The camera 3 may be an infrared camera. The position of the viewer may be detected by using a sound wave.

The viewing area information calculator 14 calculates a control parameter for setting a viewing area that accommodates the detected viewer by using the position information of the viewer supplied from the viewer position detector 13. The control parameter is, for example, the amount by which the parallax images are shifted as described in FIG. 3. The control parameter is one parameter or a combination of a plurality of parameters. The viewing area information calculator 14 supplies the calculated control parameter to the image adjuster 17.

More specifically, in order to set a desired viewing area, the viewing area information calculator 14 uses a viewing area database in which the control parameter and the viewing area set by the control parameter are associated with each other. The viewing area database is stored in the memory 18 in advance. The viewing area information calculator 14 detects a viewing area that can accommodate the viewer by searching the viewing area database.

The test pattern controller 15 outputs a test pattern signal, which is indicative of whether or not the viewer is located in a viewing area from which the viewer can view video stereoscopically, to the image output module 16. The test pattern signal also includes a plurality of parallax images, more specifically, parallax images the number of which is the same as that of the parallax images outputted by the parallax image converter 12. The test pattern is one of the features of the present embodiment. The test pattern will be described later in detail.

The image output module 16 supplies parallax image signals of the input video signal or the test pattern signal to the image adjuster 17 according to a signal transmitted from outside of the controller 10, such as a remote controller.

The image adjuster (viewing area controller) 17 performs adjustment such as shifting and interpolating the parallax image signals according to the calculated control parameter in order to control the viewing area, and thereafter supplies the parallax image signals to the liquid crystal panel 1 to cause the liquid crystal panel 1 to display the parallax images.

The memory 18 is a non-volatile memory such as a flash memory. The memory 18 stores the viewing area database, the test pattern, and the like. The memory 18 may be provided at outside of the controller 10.

The controller 10 can automatically set (automatically track) the viewing area according to the position of the viewer by the processing operation described below. First, the viewer position detector 13 detects the position of the viewer by using the video taken by the camera 3. The viewing area information calculator 14 calculates a control parameter so that the viewing area is set on the detected position of the viewer. The image adjuster 17 adjusts the parallax image signals according to the control parameter. Then, parallax images corresponding to the adjusted parallax image signals are displayed on the liquid crystal panel 1.

In this way, the face of the viewer is detected at all times and the viewing area is controlled as described above, so that a viewing area appropriate for the viewer is set in real time. However, the face of the viewer cannot necessarily be detected correctly depending on the skin color or the like, and thus, an appropriate viewing area may not be set. Therefore, in the present embodiment, a test pattern is displayed on the liquid crystal panel 1 to help the viewer to move into the viewing area.

FIGS. 5A to 5I are diagrams showing an example of the test pattern of the first embodiment. As shown in FIGS. 5A to 5I, the test pattern includes parallax images 21 to 29. These are parallax images respectively corresponding to the first to the ninth viewpoints aligned from right to left in the horizontal direction.

First, common points among the parallax images will be described.

In the present embodiment, it is assumed that the test pattern is displayed on the entire surface of the liquid crystal panel 1. Therefore, the background of the test pattern is predetermined video instead of video corresponding to the input video signal. Although any video may be used as the background, video by which stereoscopic display can be easily recognized is desired. Therefore, FIGS. 5A to 5I show an example of a cloud pattern. A rectangular area 31 is provided near the center of the test pattern. Rectangular areas 32 and 33 are provided left and right of the rectangular area 31 apart from the rectangular area 31.

Further, numerals "1" to "5" are aligned in the horizontal direction in a little lower center portion. These numerals respectively have depth values different from each other according to the values of the numerals. For example, it is displayed so that "1" is viewed in the near-side of the liquid crystal panel 1, "3" is viewed on the liquid crystal panel 1, and "5" is viewed in the far-side of the liquid crystal panel 1. It may be displayed so that "1" is viewed at the nearest-side and "5" is viewed at the furthest-side, and thereby the display may be used to adjust the stereoscopic feeling.

Next, the characteristics of the parallax images will be described.

In the center parallax image (the fourth parallax image described in the claims 25 that is suited to be viewed and the parallax image (the third parallax image described in the claims 24 on the left adjacent to the parallax image 25, a double circle (first proper mark) is displayed in a rectangular area 31. Further, a circle (second proper mark) is displayed in rectangular areas 32 and 33. The double circle and the circle are an example of a first mark, which indicates that the viewer is located approximately at the center of the viewing area.

In the parallax image (the second parallax image described in the claims 23 on the left adjacent to the parallax image 24, the parallax image (the fifth parallax image described in the claims 26 on the right adjacent to the parallax image 25, and the parallax image 29, no mark is displayed in the rectangular areas 31 to 33.

In the parallax image (the first parallax image described in the claims 22 which is on the left adjacent to the parallax image 23 and located on the right outside of the most suitable viewing area, and the parallax image 21 on the left adjacent to the parallax image 22, a left arrow is displayed in the right half of the rectangular area 31 and an up/down arrow is displayed in the rectangular areas 32 and 33. In the parallax image (the sixth parallax image described in the claims 27 which is on the right adjacent to the parallax image 26 and located on the left outside of the most suitable viewing area, and the parallax image 28 on the right adjacent to the parallax image 27, a right arrow is displayed in the left half of the rectangular area 31 and an up/down arrow is displayed in the rectangular areas 32 and 33.

The left arrow, the right arrow, and the up/down arrow are an example of a second mark, which indicates that the viewer is not located approximately at the center of the viewing area.

Note that, FIG. 5 is just an example of the test pattern. The first mark only has to be included in the parallax images 24 and 25 which are located near the center and suited to be viewed, the second mark only has to be included in the parallax images 22 and 27 which are less suited to be viewed than the parallax images 24 and 25, and the first mark and the second mark may not be included in the parallax images 23 and 26. Or, the first mark and the second mark are not arranged in the parallax images adjacent to each other and one or a plurality of parallax images including no mark only have to be present between the parallax image including the first mark and the parallax image including the second mark. For example, in the parallax images 22 and 27, the up/down arrow in the rectangular areas 32 and 33 may be omitted. In the parallax images 21 and 28, the arrow in the rectangular area 31 may be omitted.

FIG. 6 is a diagram schematically showing an image recognized by the viewer when the viewer views the parallax image 24 with the right eye and views the parallax image 25 with the left eye. FIG. 6 shows a state in which the viewer is located approximately at the center of the viewing area, in other words, the viewer is located farthest from a position where reverse view occurs, and the viewer can most appropriately view video stereoscopically. In this case, a double circle is seen in the rectangular area 31 and a circle is seen in the rectangular areas 32 and 33. Thereby, the viewer can recognize that the viewer is located at an appropriate position.

Here, the reason why no arrow is displayed in the rectangular areas 31 to 33 in the parallax images 23 and 26 is as follows. Generally, a light beam, which reaches a point at the right eye or the left eye for viewing parallax images, does not necessarily constitute 100% of only a light beam of specific one parallax image among the parallax images 21 to 29. Normally, light beams from parallax images adjacent to each other are mixed in the light beam which reaches the point because of the characteristics of light. For example, even when the right eye views the parallax image 24, the right eye views a certain amount of the parallax image 23. Similarly, even when the left eye views the parallax image 25, the left eye views a certain amount of the parallax image 26. Therefore, if there is a mark such as an arrow in the rectangular areas 31 to 33 in the parallax images 23 and 26, the viewer slightly views the marks in the parallax images 23 and 26 even when the viewer is located at an appropriate position. As a result, there is a risk that the viewer falsely recognizes that the viewer is located at an inappropriate position.

On the other hand, in the test pattern of the present embodiment, no mark is displayed in the rectangular areas 31 to 33 of the parallax images 23 and 26 adjacent to the parallax images 24 and 25 respectively in order to prevent interference, and marks are displayed in the parallax images 22 and 27 which are apart from the parallax images 24 and 25 with one parallax image in between. Therefore, even when the viewer not only views the parallax images 24 and 25, but also slightly views the parallax images 23 and 26, the viewer can correctly recognize that the viewer is located at an appropriate position.

FIG. 7 is a diagram schematically showing an image recognized by the viewer when the viewer views two parallax images among the parallax images 21 to 23 and 29 with the right eye and the left eye. FIG. 7 shows a state in which the viewer is located at the right end in the viewing area or located on the right outside of the viewing area, so that the video may not be viewed stereoscopically. In this case, instead of a double circle, a left arrow is seen in the rectangular area 31, and instead of a circle, an up/down arrow is seen in the rectangular areas 32 and 33. Thereby, the viewer can recognize that the viewer is not located at an appropriate position. Also the viewer can recognize that the viewer is not located at an appropriate position from the fact that the numerals "1" to "5" are seen double or not viewed stereoscopically in this order or that the clouds in the background blur or the clouds are seen double. Because of the reason described above, the parallax image 24 is viewed with the eyes and the double circle and the circle may be slightly seen. Also, the parallax image 28 is viewed with the eyes and the right arrow may be slightly seen.

The viewer moves left with respect to the liquid crystal panel 1 according to the left arrow in FIG. 7, so that the viewer can enter the viewing area. Or, the viewer moves in the front-back direction with respect to the liquid crystal panel 1 (direction to approach the liquid crystal panel 1 or direction to get away from the liquid crystal panel 1) according to the up/down arrow, so that the viewer can enter the viewing area.

Similarly, when the viewer is located at the left end in the viewing area or located on the left outside of the viewing area, the viewer sees the right arrow. The viewer moves right with respect to the liquid crystal panel 1 according to the right arrow, so that the viewer can enter an appropriate position in the viewing area.

Here, the reason why an arrow is displayed in the right half of the rectangular area 31 in the parallax image 22 and in the left half of the rectangular area 31 in the parallax image 28 is as follows. For example, even when one eye views the parallax image 21 and the other eye views the parallax image 29, the eyes may see the parallax image 28. Therefore, if the left arrow is displayed in the entire rectangular area 31 of the parallax image 21 and the right arrow is displayed in the entire rectangular area 31 of the parallax image 28, as shown in FIG. 8A, the right arrow and the left arrow overlap each other, and thus, there is a risk that the orientation of the arrow cannot be recognized or even what is displayed cannot be recognized.

Figure 9:
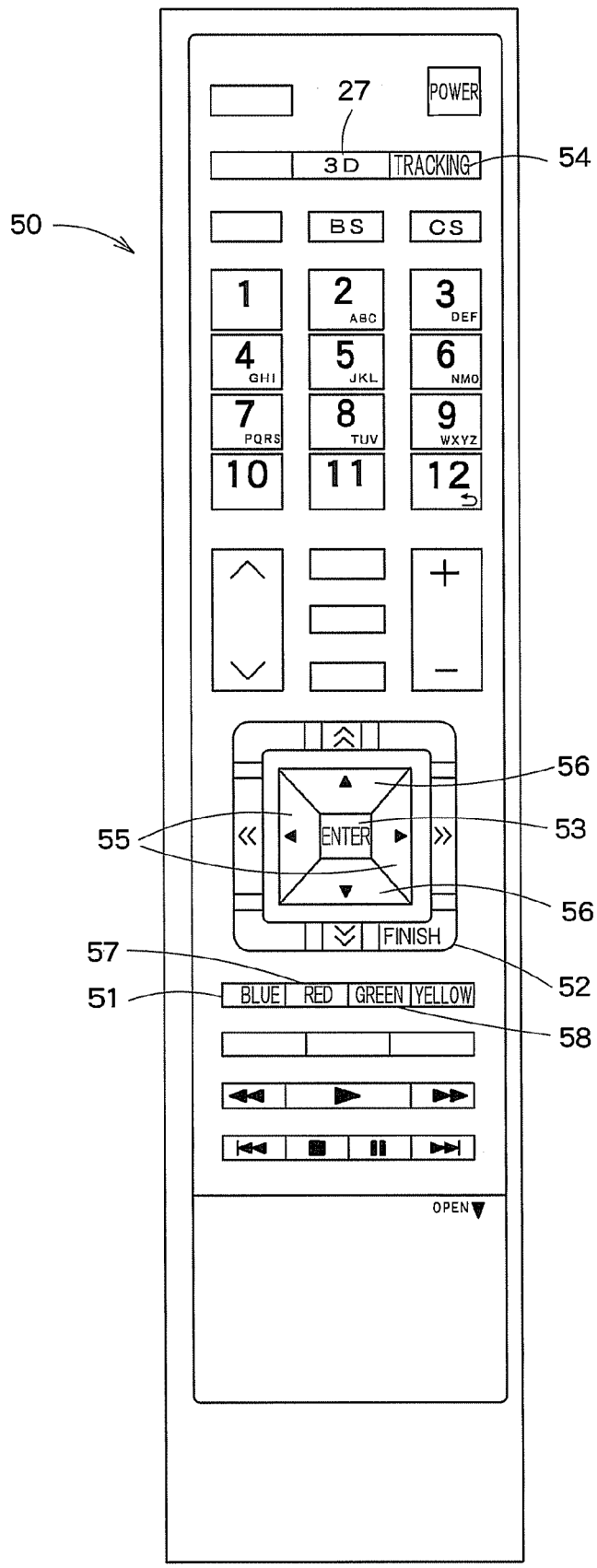
FIG. 9 is a diagram showing an example of the remote control used by the viewer.

On the other hand, in the test pattern of the present embodiment, an arrow is displayed in a half area of the rectangular area 31, so that even if both the parallax images 21 and 28 are seen, the arrow is recognized as shown in FIG. 8B. In this case, an arrow in a parallax image which is more strongly viewed with eyes (the right arrow in the example of FIG. 8B) is clearly recognized. It is understood that the viewer may move according to an arrow which is clearly displayed. Display or non-display of the test pattern is controlled according to a remote control operation by the viewer. FIG. 9 is a diagram showing an example of the remote control used by the viewer. FIG. 10 is a flowchart showing an example of a processing operation of the controller 10 according to the remote control operation.

While stereoscopic video according to a video signal inputted from the outside is displayed, if the viewer presses a predetermined key (for example, a blue key 51) on the remote control, the remote control transmits an infrared test pattern display signal. When the light receiver 4 receives the infrared test pattern display signal (YES in step S1), the image output module 16 of the controller 10 outputs the parallax image signals of the test pattern signal outputted from the test pattern controller 15 instead of the parallax image signals of the input video signal outputted from the parallax image converter 12 to the image adjuster 17. The image adjuster 17 adjusts the parallax image signals of the test pattern signal according to the control parameter and supplies the parallax image signals to the liquid crystal panel 1 (step S2). As a result, the test pattern shown in FIG. 5 is displayed on the liquid crystal panel 1.

By the test pattern, the viewer can determine whether or not the viewer is located at a position from which the viewer can view video stereoscopically.

Thereafter, while the test pattern is displayed, if the viewer presses a predetermined key (for example, a finish key 52 or an enter key 53) on the remote control, the remote control generates an infrared test pattern finish signal. When the light receiver 4 receives the infrared test pattern finish signal (YES in step S3), the image output module 16 of the controller 10 outputs the parallax image signals of the input video signal outputted from the parallax image converter 12 instead of the parallax image signals of the test pattern signal outputted from the test pattern controller 15 to the image adjuster 17. The image adjuster 17 adjusts the parallax image signals of the input video signal according to the control parameter and supplies the parallax image signals to the liquid crystal panel 1 (step S4). As a result, a video signal according to the input video signal is displayed on the liquid crystal panel 1.

In this way, in the first embodiment, the test pattern having a plurality of parallax images including different marks is displayed. Therefore, the viewer can recognize whether or not the viewer is located at an appropriate position according to the marks that can be seen. Specifically, when the viewer is located near the center of the viewing area which is the most appropriate position, the double circle and the circle in the parallax images 24 and 25 are seen. At this time, because the parallax images 23 and 26 adjacent to the respective two parallax images 24 and 25 at the center include no arrow, the arrow is hardly seen and the viewer can surely recognize that the viewer is located near the center of the viewing area. On the other hand, when the viewer is not located near the center of the viewing area, the arrows in the parallax images 21, 22, 27, and 28 are seen. Since an arrow is displayed in the left half or the right half of the rectangular area 31, the viewer can surely recognize the orientation of the arrow and the viewer can move to the center of the viewing area by following the arrow.

(Second Embodiment)

In the first embodiment described above, when the viewer is not located at the center of the viewing area, the viewer moves to the center of the viewing area. On the other hand, in a second embodiment described below, the viewer does not move, but the viewer moves the viewing area while viewing the test pattern. Since the configuration of the video display device 100 is similar to that shown in FIG. 1, the drawing thereof is omitted and different points will be mainly described below.

The viewing area information calculator 14 of the present embodiment calculates the control parameter according to the position of the viewer detected by the viewer position detector 13. In addition, the viewing area information calculator 14 can adjust the control parameter according to a signal inputted from the outside of the controller 10 such as the remote control.

FIG. 11 is a diagram showing an example of the test pattern of the second embodiment. Although FIG. 11 shows only a parallax image 24a corresponding to the parallax image 24 in FIG. 5, the test pattern actually includes nine parallax images 21a to 29a.

The parallax image 24a in FIG. 11 further includes an upper left rectangular area 34 in which explanatory texts that help the operation of the viewer and upper right rectangular areas 35 and 36 in which a slide bar described later is displayed. The other parallax images 21a to 29a not shown in FIG. 11 are also parallax images in which the rectangular areas 34 to 36 are added to the parallax images 21 to 29, respectively, shown in FIG. 5.

FIG. 12 is a flowchart showing an example of a processing operation of the controller 10 when the controller 10 adjusts the viewing area by using the test pattern shown in FIG. 11.

When the viewer cannot stereoscopically view video displayed on the liquid crystal panel 1, it is considered that the viewer is not located near the center of the viewing area. Therefore, the viewer presses a blue button on the remote control. Thereby, the test pattern is displayed in the same manner as in the first embodiment. (YES in step S11, S12)

The viewer presses a left/right key 55 and an up/down key 56 to move the viewing area while viewing the displayed test pattern. Various viewing area adjustment signals are generated in response to this operation. When the light receiver 3 receives a viewing area adjustment signal (YES in step S13), the viewing area information calculator 14 re-calculates the control parameter and the image adjuster 17 adjusts the viewing area in response to the re-calculated control parameter (step S14). The specific operations are as follows.

When, instead of the double circle, an arrow is seen in the rectangular area 31, the viewer presses a left key 55 or a right key 55 to move the viewing area to the left or right. For example, when the left arrow is seen, the viewer presses the left key 55. In response to this operation, as described using FIG. 3B, the image adjuster 17 performs a process to shift the display position of the parallax images to the right. Thereby, the parallax moves to the left.

The parallax can be adjusted by only a predetermined number of steps. The parallax moves only one step each time the left key 55 or the right key 55 is pressed. A circle in the rectangular area 36 schematically shows the current position of the viewing area. Specifically, the circle is located at the center in an initial state. When the left key 55 and the right key 55 are pressed, the circle moves to the left and right respectively. Thereby, the viewer can visually recognize a state in which the viewing area is moving.

When, instead of the circle, an up/down arrow is seen in the rectangular areas 32 and 33, the viewer presses an up key 56 or a down key 56 to move the viewing area in the front-back direction with respect to the liquid crystal panel 1. When the up key 56 or the down key 56 is pressed, as described using FIG. 3C, the image adjuster 17 performs a process to shift the parallax images by different amounts and appropriately interpolate the parallax images. Thereby, the parallax moves forward or backward.

The parallax can be adjusted by only a predetermined number of steps. The parallax moves only one step each time the up key 56 or the down key 56 is pressed. A circle in the rectangular area 35 schematically shows the current position of the viewing area. Specifically, the circle is located at the center in an initial state. When the up key 56 and the down key 56 are pressed, the circle moves up and down respectively.

The adjustment of the viewing area as described above is repeatedly performed and the position of the viewer is adjusted to be near the center of the viewing area, the viewer sees the double circle in the rectangular area 31 and the circle in the rectangular areas 32 and 33. When the adjustment of the viewing area is completed, the viewer presses a remote control finish key 52 or an enter key 53. In response to this operation, the display of the test pattern is finished and the video according to the input video signal is displayed (YES in step S15, S16).

At this time, the control parameter re-calculated by the viewing area information calculator 14 is stored in the memory 18 or the image adjuster 17. Thereby, the viewer can view the video stereoscopically in an appropriately adjusted viewing area.

Note that, in order to improve convenience for the viewer, the controller 10 may perform a process other than the process shown in FIG. 12. For example, when a red key 57 is pressed during a period between step S11 and step S15, the viewing area may be returned to the initial setting. When a green key 58 is pressed, the viewing area may be returned to the viewing area before the adjustment. Or, when the blue key 51 is pressed, the video taken by the camera 3 may be displayed instead of the test pattern.

In this way, in the second embodiment, while the test pattern having a plurality of parallax images including different marks is displayed, the control of the viewing area described in FIG. 3 and the explanation thereof is performed on the basis of the remote control operation of the viewer. Thereby, the viewer can simply adjust the viewing area to an appropriate position.

(Third Embodiment)

The first and the second embodiments described above are to display the test pattern on the entire surface of the liquid crystal panel 1. On the other hand, a third embodiment described below is to display the test pattern by superimposing the test pattern on a part of the video. Because the configuration of the video display device 100 is similar to that shown in FIG. 1, the drawing thereof is omitted and different points will be mainly described below.

FIG. 13 is a diagram showing an example of the test pattern of the third embodiment. The test pattern is different from those shown in FIGS. 5 and 11. Video corresponding to a video signal inputted from the outside is displayed in the background and rectangular areas 41 to 43 are provided in a part of the video. The marks displayed in the rectangular areas 41 to 43 are the same as those displayed in the rectangular areas 31 to 33 in FIG. 5 respectively.

FIG. 14 is a flowchart showing an example of a processing operation of the controller 10. While stereoscopic video according to a video signal inputted from the outside is displayed, when the viewer presses a predetermined key on the remote control, the remote control transmits an infrared test pattern display signal. When the light receiver 4 receives the infrared test pattern display signal (YES in step S21), the image adjuster 17 of the controller 10 superimposes the parallax image signals of the test pattern signal outputted from the test pattern controller 15 on the parallax image signals of the video signal outputted from the parallax image converter 12, and supplies the superimposed parallax image signals to the liquid crystal panel 1 (step S22). More specifically, the video signal outputted from the image adjuster 17 is a signal obtained by overwriting the parallax images of the test pattern signal on only the areas of the rectangular areas 41 to 43 of the parallax images of the input video signal. Or the image adjuster 17 may blend the parallax images of the input video signal and the parallax images of the test pattern signal at a predetermined ratio in the areas of the rectangular areas 41 to 43.

Thereby, the test pattern shown in FIG. 13 is superimposed on the input video and displayed. Because the test pattern is displayed on the end of the liquid crystal panel 1, the viewer can confirm whether or not the viewer is located at a position from which the viewer can view the video stereoscopically while viewing the input video and the viewer can move into the viewing area as needed.

Thereafter, while the test pattern is displayed, when the viewer presses a predetermined key on the remote control, the display of the test pattern is finished and the video corresponding to the input video signal is displayed (YES in step S23, S24).

It is possible to select and display either one of the test pattern of FIG. 5 described in the first embodiment or the test pattern of FIG. 13. In this case, a key for displaying the test pattern of FIG. 5 and a key for displaying the test pattern of FIG. 13 may be set separately on the remote control.

In this way, in the third embodiment, the test pattern is superimposed on a part of the video and displayed. Therefore, the viewer can determine whether or not the viewer is located at an appropriate position while enjoying the video.

Although, in each embodiment, an example is described in which the lenticular lens 2 is used and the viewing area is controlled by shifting the parallax images, the viewing area may be controlled by other manners. For example, instead of the lenticular lens 2, a parallax barrier may be provided as an aperture controller 2'. FIG. 15 is a block diagram showing a schematic configuration of the video display device 100' which is a modified example of the embodiments shown in FIG. 2. As shown in FIG. 15, the controller 10' of the video display device 100' has the viewing area controller 17' instead of the image adjuster 17.

The viewing area controller 17' controls the aperture controller 2' according to the control parameter calculated by the viewing area information calculator 14. In the present modified example, the control parameter includes a distance between the liquid crystal panel 1 and the aperture controller 2', the amount of shift between the liquid crystal panel 1 and the aperture controller 2' in the horizontal direction, and the like.

In the present modified example, the output direction of the parallax images displayed on the liquid crystal panel 1 is controlled by the aperture controller 2', so that the viewing area is controlled. In this way, the viewing area controller 17' may control the aperture controller 2' without performing a process for shifting the parallax images.

Although, in each embodiment, an example is described in which the processing operation of the controller 10 is controlled by using a remote controller, the processing operation may be controlled by providing buttons on a main body of the video display device 100 and pressing the buttons.

At least a part of the controller 10 explained in the above embodiments can be formed of hardware or software. When the controller 10 is partially formed of the software, it is possible to store a program implementing at least a partial function of the controller 10 in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the controller 10 can be distributed through a communication line (including radio communication) such as the Internet etc. Furthermore, the program which is encrypted, modulated, or compressed can be distributed through a wired line or a radio link such as the Internet etc. or through the recording medium storing the program.

Although, in each embodiment, an example of the video processor which can process 9 parallaxes is described, the embodiments can be applied to a 3D video display device including 5 or more parallaxes, and of course, the embodiments can be applied to a 3D video display device including 10 or more parallaxes.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:

1. A video processing device comprising:
a test pattern controller configured to output a test pattern to a display capable of displaying stereoscopically, the test pattern being indicative of whether a viewer is substantially at a center of a viewing area in which a video is viewed stereoscopically,
wherein the test pattern comprises a first, second, third, fourth, fifth, and sixth parallax image corresponding to a respective first, second, third, fourth, fifth, and sixth viewing point arranged in a horizontal direction,
the third parallax image and the fourth parallax image comprise a first mark,
the first parallax image and the sixth parallax image comprise a second mark different from the first mark, and
the second parallax image and the fifth parallax image comprise neither the first mark nor second mark.

2. The device of claim 1, wherein
the first mark indicates that the viewer is substantially at the center of the viewing area, and
the second mark indicates that the viewer is not substantially at the center of the viewing area.

3. The device of claim 1, wherein
the second mark in the first parallax image is displayed at a half of right side of an area corresponding to an area in which the first mark in the third parallax image is displayed, and
the second mark in the sixth parallax image is displayed at a half of left side of the area corresponding to the area in which the first mark in the third parallax image is displayed.

4. The device of claim 1, wherein the first, second, third, fourth, fifth, and sixth viewing points are arranged from right to left, the second mark in the first parallax image comprises a left arrow, and the second mark in the sixth parallax image comprises a right arrow.

5. The device of claim 4, wherein the second mark further comprises an up/down arrow displayed on a position different from a position on which the left arrow and the right arrow are displayed.

6. The device of claim 1, wherein the first mark comprises:
a first proper mark displayed substantially on a center of a third parallax image and on a center of a fourth parallax image; and
a second proper mark displayed at a left side of the first proper mark and a right side thereof.

7. The device of claim 1, wherein the test pattern comprises a plurality of numerals, and
each of the numerals is displayed on the display whose depth depends on a value of each of the numerals.

8. The device of claim 7, wherein
at least one of the numerals is displayed so as to be viewed on the display,
at least one of the numerals is displayed so as to be viewed at a near-side of the display, and
at least one of the numerals is displayed so as to be viewed at a far-side of the display.

9. The device of claim 1, further comprising:
a receiver configured to receive an input video signal inputted from outside;
a parallax image converter configured to convert the input video signal to a plurality of parallax images; and
an image output module configured to display the parallax image, the test pattern being superimposed on a part of the parallax image.

10. The device of claim 9, wherein the receiver is configured to receive, tune, and decode a broadcast wave to generate the input video signal.

11. The device of claim 1, further comprising:
a viewing area information calculator configured to calculate a control parameter for adjusting the viewing area according to a viewing area adjustment signal inputted from outside; and
a viewing area controller configured to adjust the viewing area according to the control parameter.

12. The device of claim 11, wherein the viewing area information calculator is configured to calculate the control parameter for adjusting the viewing area in a left-right direction and in a front-back direction.

13. The device of claim 12, wherein, according to the control parameter, the viewing area controller is configured to:

adjust the viewing area in a left-right direction by shifting a displaying position of the first, second, third, fourth, fifth, and sixth parallax images by a constant distance, and adjust the viewing area in a front-back direction by shifting a displaying position of the first, second, third, fourth, fifth, and sixth parallax images, an amount of shift for the third parallax image and the fourth parallax image is different from an amount of shift for the first parallax image and the sixth parallax image.

14. The device of claim 11, wherein the viewing area information calculator is configured to calculate the control parameter for adjusting the viewing area by a first number of steps, and the test pattern comprises a viewing area adjustment pattern indicative of a present adjustment step.

15. The device of claim 14, wherein the viewing area adjustment pattern is a slide bar.

16. The device of claim 11, further comprising:
a receiver configured to receive an input video signal inputted from outside; and
a parallax image converter configured to convert the input video signal to a plurality of parallax images,
wherein the viewing area controller is configured to adjust the viewing area when the parallax images of the input video signal is displayed according to the control parameter on which an adjustment result of the viewing area is reflected.

17. The device of claim 11, further comprising:
a viewer position detector configured to detect a position of a viewer using a video taken by a camera,
wherein the viewing area information calculator is configured to calculate the control parameter so that the viewing area is set to an area according to the position of the viewer, and then, adjust the control parameter according to the viewing area adjustment signal.

18. The device of claim 1, further comprising a display on which the test pattern is displayed.

19. A video processing method comprising:
outputting a test pattern to a display capable of displaying stereoscopically, the test pattern being indicative of whether a viewer is substantially at a center of a viewing area in which a video is viewed stereoscopically, and
adjusting the viewing area according to a viewing area adjustment signal inputted from outside,
wherein the test pattern comprises a first, second, third, fourth, fifth, and sixth parallax image corresponding to a respective first, second, third, fourth, fifth, and sixth viewing point arranged in a horizontal direction,
the third parallax image and the fourth parallax image comprise a first mark,
the first parallax image and the sixth parallax image comprise a second mark different from the first mark, and
the second parallax image and the fifth parallax image comprise neither the first mark nor second mark.

20. A non-transitory computer recordable medium configured to:
store a test pattern indicative of whether a viewer is substantially at a center of a viewing area in which a video is viewed stereoscopically,
wherein the test pattern comprises a first, second, third, fourth, fifth, and sixth parallax image corresponding to a respective first, second, third, fourth, fifth, and sixth viewing point arranged in a horizontal direction,
the third parallax image and the fourth parallax image comprise a first mark,
the first parallax image and the sixth parallax image comprise a second mark different from the first mark, and
the second parallax image and the fifth parallax image comprise neither the first mark nor second mark.

* * * * *